United States Patent
Kawai et al.

(10) Patent No.: US 11,440,128 B2
(45) Date of Patent: Sep. 13, 2022

(54) ELECTRODE ORIENTATION CHECKING APPARATUS AND ELECTRODE ORIENTATION CHECKING METHOD

(71) Applicant: HONDA MOTOR CO., LTD., Tokyo (JP)

(72) Inventors: Yasuhiro Kawai, Tochigi-ken (JP); Mitsutaka Igaue, Tochigi-ken (JP); Tetsuya Kodama, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 232 days.

(21) Appl. No.: 16/724,611

(22) Filed: Dec. 23, 2019

(65) Prior Publication Data
US 2020/0215641 A1  Jul. 9, 2020

(30) Foreign Application Priority Data
Jan. 9, 2019  (JP) .............................. JP2019-001682

(51) Int. Cl.
*B23K 11/25* (2006.01)
*B23K 11/06* (2006.01)
(Continued)

(52) U.S. Cl.
CPC .......... *B23K 11/253* (2013.01); *B23K 11/061* (2013.01); *B23K 11/3036* (2013.01); *B23K 11/312* (2013.01)

(58) Field of Classification Search
CPC . B23K 11/061; B23K 11/253; B23K 11/3036; B23K 11/3063; B23K 11/3072; B23K 11/312; B23K 11/317
(Continued)

(56) References Cited

U.S. PATENT DOCUMENTS

| 2012/0074103 A1* | 3/2012 | Hasegawa .............. B23K 11/08 219/102 |
| 2015/0367441 A1 | 12/2015 | Kaneko et al. |
| 2016/0303681 A1* | 10/2016 | Lee .................... B23K 11/3063 |

FOREIGN PATENT DOCUMENTS

| CN | 104677337 | 6/2015 |
| CN | 104918742 | 9/2015 |
| JP | 5865132 | 2/2016 |

OTHER PUBLICATIONS

Chinese Office Action and Search Report for Chinese Patent Application No. 202010022446.X dated Apr. 23, 2021.

* cited by examiner

*Primary Examiner* — Justin C Dodson
(74) *Attorney, Agent, or Firm* — Amin, Turocy & Watson, LLP

(57) ABSTRACT

An electrode orientation checking apparatus includes a machine stand attached to a seam welding apparatus from which one roller electrode of a set has been removed, a positioning guide and a set of distance sensors that are provided on the machine stand, and a calculating section. A positioning surface of the positioning guide is fixed at a position corresponding to a portion of an outer circumferential surface of the one roller electrode before being removed, the portion lying on a line segment connecting rotational centers of the roller electrodes. The distance sensors are respectively fixed forward and backward of the positioning surface in a progression direction of the roller electrodes. The calculating section calculates data for acquiring a direction of the line segment relative to the stacked body.

5 Claims, 8 Drawing Sheets

(51) Int. Cl.
  *B23K 11/30* (2006.01)
  *B23K 11/31* (2006.01)
(58) Field of Classification Search
  USPC .................................................. 73/718, 724
  See application file for complete search history.

(PROGRESSION DIRECTION)

FIG. 8

ELECTRODE ORIENTATION CHECKING APPARATUS AND ELECTRODE ORIENTATION CHECKING METHOD

CROSS-REFERENCE TO RELATED APPLICATION

This application is based upon and claims the benefit of priority from Japanese Patent Application No. 2019-001682 filed on Jan. 9, 2019, the contents of which are incorporated herein by reference.

BACKGROUND OF THE INVENTION

Field of the Invention

The present invention relates to an electrode orientation checking apparatus and an electrode orientation checking method for checking the orientation of roller electrodes of a seam welding apparatus.

Description of the Related Art

A seam welding method is known for bonding together workpieces of a stacked body formed of a plurality of stacked workpieces made of metal plates or the like, by continuously forming a plurality of nuggets in a manner to overlap with each other between the workpieces. A seam welding apparatus that performs the seam welding includes a set of roller electrodes sandwiching the stacked body. The seam welding is performed by causing welding target location of the stacked body to progress relatively while causing intermittent conduction between these roller electrodes and also rotating these roller electrodes.

As shown in Japanese Patent No. 5865132, in this type of seam welding apparatus, there are cases where the seam welding is performed in a state where a line segment connecting the rotational centers of the roller electrodes (also referred to below simply as a "line segment") in the set is relatively inclined forward or backward in the progression direction of the roller electrodes (also referred to below simply as the "progression direction") relative to the stacking direction of the stacked body.

By suitably setting the orientation of the roller electrodes relative to the stacked body during such welding according to the shape or the like of the stacked body, it is possible to favorably form the nuggets and to restrict the occurrence of sputtering, for example. Essentially, in order to perform the seam welding favorably, the roller electrodes must be kept at a suitable orientation relative to the stacked body, and there is a demand that, during the actual welding, it be possible to accurately check the orientation of the roller electrodes relative to the stacked body.

SUMMARY OF THE INVENTION

However, in a case where the direction of the line segment relative to the stacked body is checked as the orientation of the roller electrodes, since this check relies on the vision of a worker, it is difficult to accurately check the orientation, during welding, of the roller electrodes with respect to various shapes of stacked bodies.

The present invention aims to solve the problem described above, and it is an object of the present invention to provide an electrode orientation checking apparatus and an electrode orientation checking method making it possible to check the orientation, during welding, of the roller electrodes with respect to the stacked bodies of the workpiece with high accuracy in a seam welding apparatus.

One aspect of the present invention is a an electrode orientation checking apparatus that, for a seam welding apparatus that performs seam welding by sandwiching a stacked body comprising a plurality of stacked workpieces between a set of roller electrodes, checks an orientation of the roller electrodes relative to the stacked body, the electrode orientation checking apparatus comprising a machine stand that is detachably attached to the seam welding apparatus from which one roller electrode of the set of roller electrodes has been removed; a positioning guide that is provided on the machine stand and includes a positioning surface fixed at a position that, when the stacked body is sandwiched between the one roller electrode before being removed and another roller electrode of the set of roller electrodes, corresponds to a portion of an outer circumferential surface of the one roller electrode, the portion lying on a line segment connecting rotational centers of the set of roller electrodes; a set of distance sensors provided on the machine stand, respectively fixed farther forward than the positioning surface and farther backward than the positioning surface in a progression direction of the roller electrodes relative to the stacked body, and each configured to detect a distance, along an extension direction of the line segment, to the stacked body sandwiched by the positioning surface and the other roller electrode; and a calculating section configured to calculate data for acquiring a direction of the line segment relative to the stacked body, based on detection results of the set of distance sensors.

Another aspect of the present invention is an electrode orientation checking method that, for a seam welding apparatus that performs seam welding by sandwiching a stacked body comprising a plurality of stacked workpieces between a set of roller electrodes, checks an orientation of the roller electrodes relative to the stacked body, the electrode orientation checking method comprising a fixing step of detachably attaching a machine stand that includes a positioning guide to the seam welding apparatus from which one roller electrode of the set of roller electrodes has been removed, and fixing a positioning surface of the positioning guide at a position that, when the stacked body is sandwiched between the one roller electrode before being removed and another roller electrode of the set of roller electrodes, corresponds to a portion of an outer circumferential surface of the one roller electrode, the portion lying on a line segment connecting rotational centers of the set of roller electrodes; a detection step of, with a set of distance sensors provided on the machine stand and respectively fixed farther forward than the positioning surface and farther backward than the positioning surface in a progression direction of the roller electrodes relative to the stacked body, detecting a distance, along an extension direction of the line segment, to the stacked body sandwiched by the positioning surface and the other roller electrode; and a calculation step of calculating data for acquiring a direction of the line segment relative to the stacked body, based on detection results of the set of distance sensors.

In the present invention, the machine stand is attached to the seam welding apparatus from which one roller electrode has been removed, and the positioning surface and the set of distance sensors are fixed in the arrangement described above. Due to this, it is possible to reproduce, with the positioning surface, the portion of the outer circumferential surface of the one roller before being removed, the portion lying on the line segment connecting the rotational centers of the roller electrodes (referred to below simply as the "line segment"). Therefore, by calculating the data for acquiring the direction of the line segment relative to the stacked body based on the detection results of the set of distance sensors, it is possible to obtain the direction of the line segment relative to the stacked body corresponding to a case where the stacked body is sandwiched by the set of roller electrodes during actual welding by the seam welding apparatus, without relying on the vision of a worker or the like. Accordingly, the orientation, during welding, of the roller electrodes relative to the stacked body can be checked with a high accuracy.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The following describes in detail preferred embodiments of an electrode orientation checking apparatus and an electrode orientation checking method according to the present invention, while referencing the accompanying drawings. In the drawings below, configurational elements that realize identical or similar functions and effects are given the same reference numerals, and repetitive descriptions thereof may be omitted.

Figure 1:
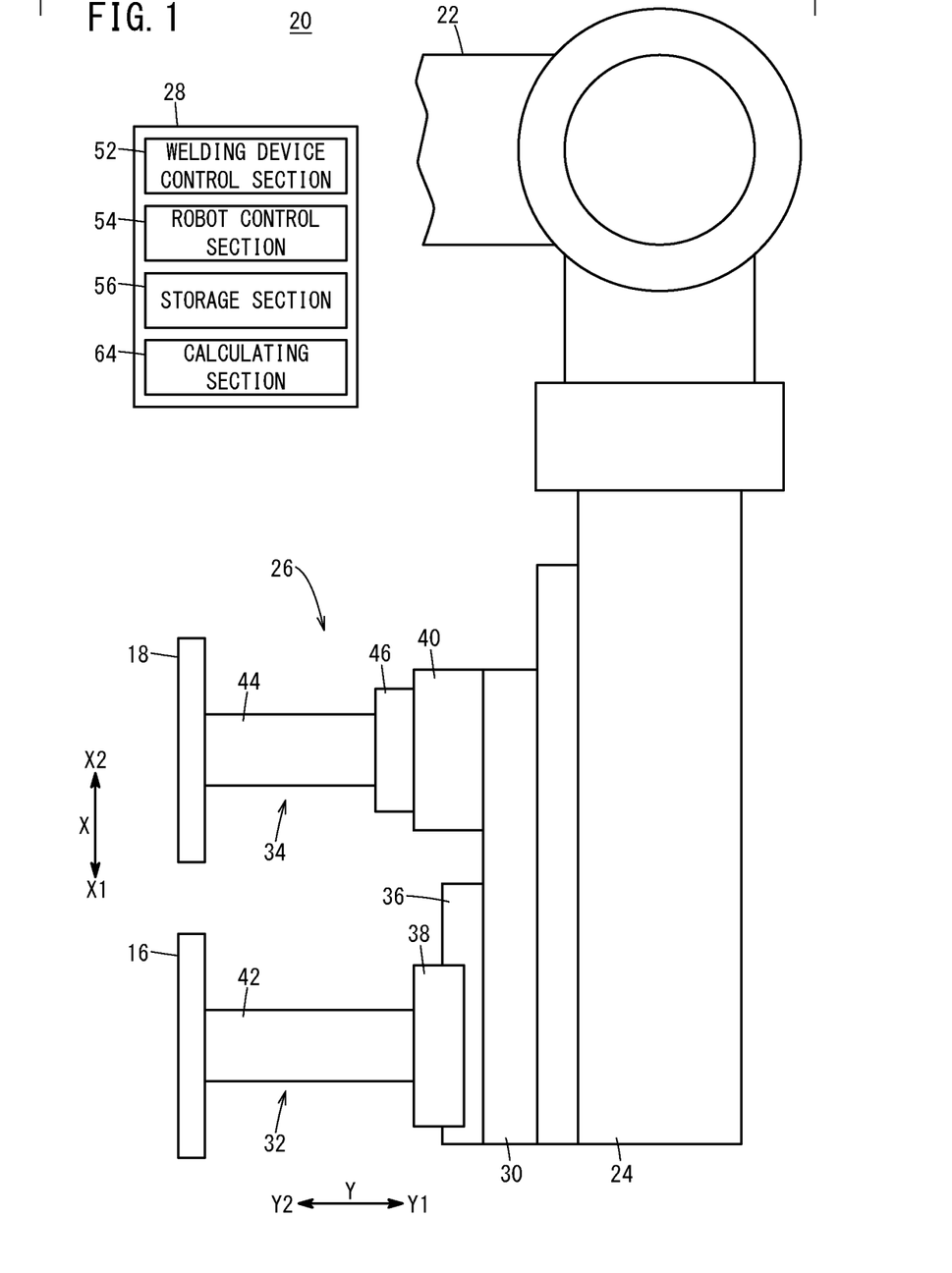
FIG. 1 is a main component schematic configurational diagram of a seam welding apparatus in a state where an electrode orientation checking apparatus according to an embodiment of the present invention is not attached thereto.
Figure 2:
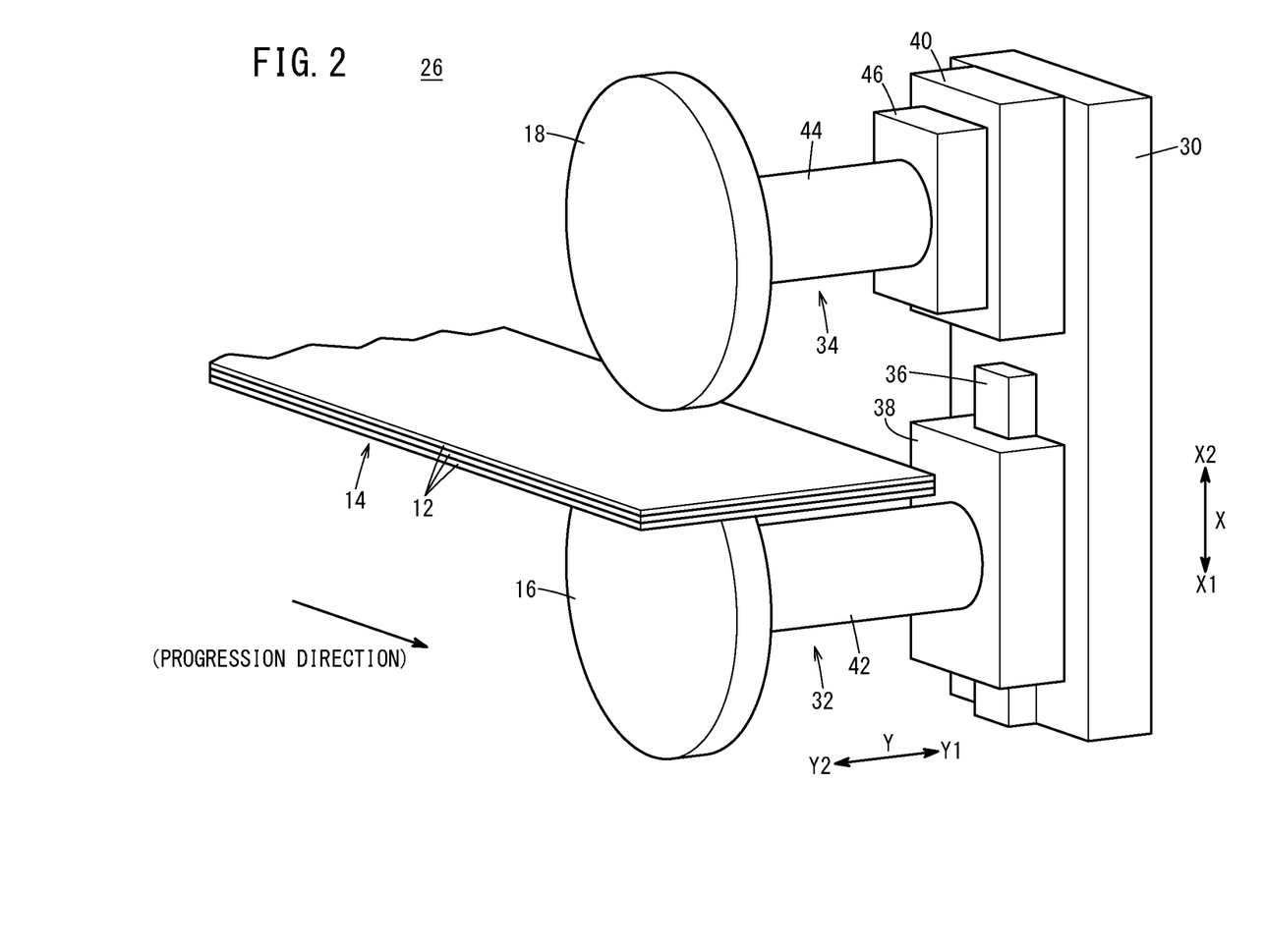
FIG. 2 is a main component perspective view for describing a state in which a stacked body is sandwiched by a set of roller electrodes of the seam welding apparatus of FIG. 1.
Figure 3:
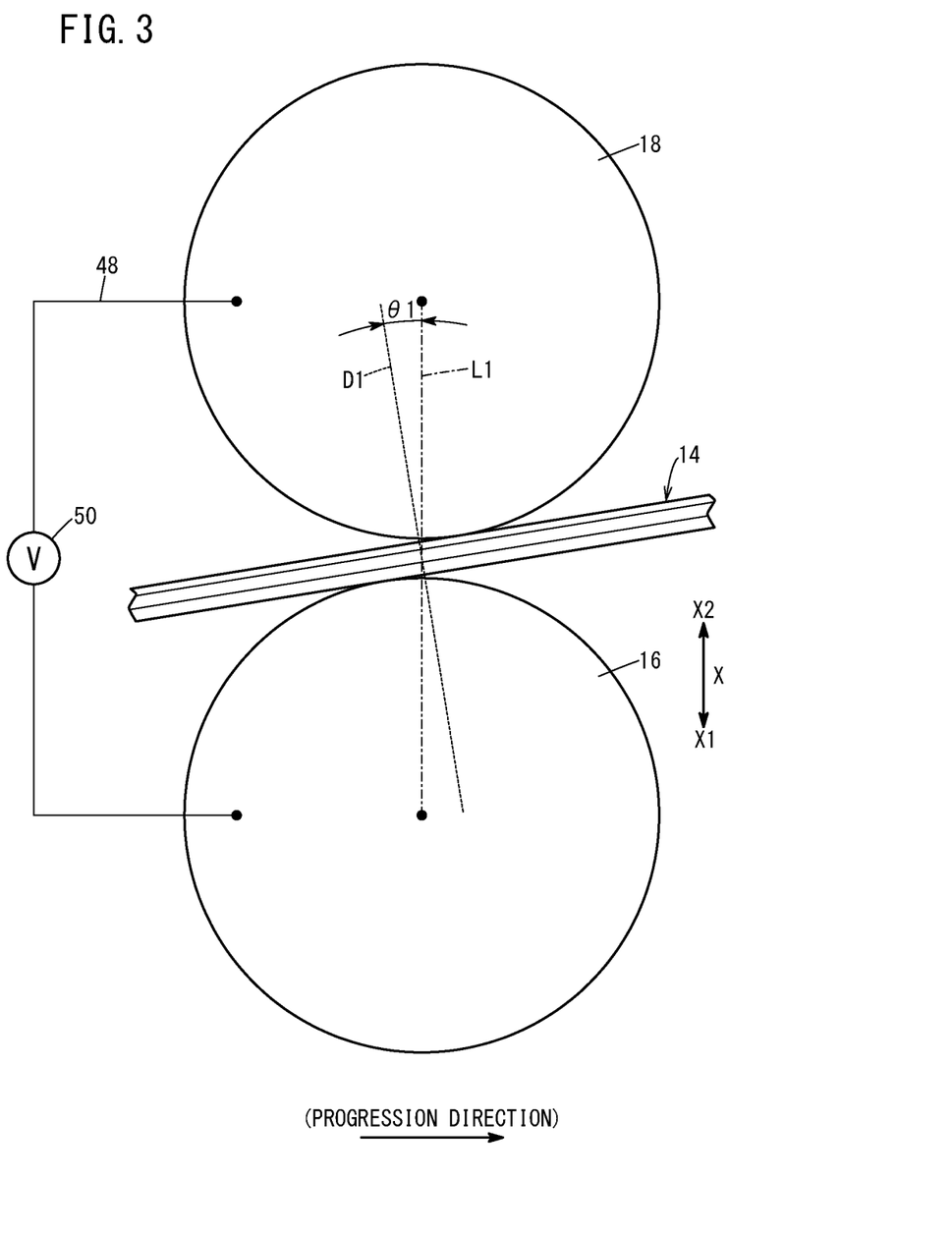
FIG. 3 is a descriptive diagram for describing an orientation of the set of roller electrodes relative to the stacked body during welding by the seam welding apparatus of FIG. 1.

As shown in FIGS. 2 and 3, an electrode orientation checking apparatus 10 (see FIGS. 4 to 7) according to the present embodiment can be used by being attached to a seam welding apparatus 20 (see FIG. 1) that performs seam welding by sandwiching a stacked body 14 formed of a plurality of stacked workpieces 12 between the outer circumferential surfaces of a first roller electrode 16 and a second roller electrode 18 shaped as discs. First, a simple description of the seam welding apparatus 20 is provided, while referencing FIGS. 1 to 3.

The stacked body 14 is a flange portion forming a door opening portion of an automobile (none of which are shown in the drawings), for example, and is formed by stacking three workpieces 12 (metal plates). The number of workpieces 12 stacked to form the stacked body 14 is not limited to three, and may instead be two or may be four or more.

As shown in FIG. 1, the seam welding apparatus 20 includes an articulated robot 22, a seam welding device 26 that is supported by a front end arm 24 of the articulated robot 22, and a control unit 28 that controls the articulated robot 22 and the seam welding device 26. The articulated robot 22 is configured as a so-called industrial robot, and is capable of moving the seam welding device 26 at any position and to any orientation under the control of the control unit 28.

The seam welding device 26 includes a first drive mechanism 32 and a second drive mechanism 34 that are supported on the front end arm 24 via a mount 30, the first roller electrode 16 attached to the first drive mechanism 32, and the second roller electrode 18 attached to the second drive mechanism 34.

As shown in FIGS. 1 and 2, a guide rail 36 is arranged along the mount 30 in the X-arrow direction. A first table 38 of the first drive mechanism 32 is provided at a bottom end side (X1-arrow side) of the guide rail 36, in a manner to be movable along this guide rail 36 by a cylinder or the like (not shown in the drawings). A second table 40 of the second drive mechanism 34 is provided, in a fixed state, above the guide rail 36 in the extension direction thereof (X2-arrow direction side). Alternatively, the second table 40 may be provided to be moveable along the guide rail 36 instead of the first table 38, and the first table 38 may be provided to the guide rail 36 in a fixed state. Furthermore, both the first table 38 and the second table 40 may be provided to be movable along the guide rail 36.

One end side (Y1-arrow side) of a support member 42, which is shaped as a cylindrical pillar extending in the Y-arrow direction, is fixed to the first table 38. The first roller electrode 16 is fixed to the other end side (Y2-arrow side) of the support member 42, in a manner to be rotatable and attachable/detachable.

The second drive mechanism 34 includes a rotational drive mechanism 46 that rotationally drives a rotating shaft 44. The rotating shaft 44 extends along the Y-arrow direction, one end side (Y1-arrow side) of the rotating shaft 44 is supported by the rotational drive mechanism 46, and the second roller electrode 18 is fixed to the other end side (Y2-arrow side) of the rotating shaft 44.

Essentially, by moving the first table 38 and second table 40 to be relatively closer together or farther apart, it is possible to move the first roller electrode 16 and the second roller electrode 18 to be relatively closer together or farther apart. Therefore, by moving the first roller electrode 16 and the second roller electrode 18 (also referred to below collectively as the "set of roller electrodes 16 and 18") to be closer together while the stacked body 14 is interposed therebetween, it is possible to sandwich the stacked body 14 between the outer circumferential surfaces of the set of roller electrodes 16 and 18.

Furthermore, it is possible to rotationally drive the second roller electrode 18 with the rotational drive mechanism 46, via the rotating shaft 44. Therefore, by rotationally driving the second roller electrode 18 while the stacked body 14 is sandwiched between the set of roller electrodes 16 and 18, it is possible to cause the set of roller electrodes 16 and 18 to progress relative to the stacked body 14. In the following, the progression direction of the set of roller electrodes 16 and 18 relative to the stacked body 14 is also referred to simply as the "progression direction".

In the present embodiment, the seam welding apparatus 20 causes the set of roller electrodes 16 and 18 to travel relative to the stacked body 14 via the second roller electrode 18, by rotationally driving the second roller electrode 18 with the rotational drive mechanism 46. However, the seam welding apparatus 20 does not need to include the rotational drive mechanism 46, and may cause the set of roller electrodes 16 and 18 to progress relative to the stacked body 14 while rotating, by moving the front end arm 24 with the articulated robot 22 (see FIG. 1).

As shown in FIG. 3, a line segment L1 connecting the rotational centers of the roller electrodes 16 and 18 (also referred to below simply as the "line segment L1") lies along the extension direction (X-arrow direction) of the guide rail 36 (see FIGS. 1 and 2). In the present embodiment, the first roller electrode 16 and the second roller electrode 18 have the same shape as each other, but the first roller electrode 16 and the second roller electrode 18 may have different diameters, widths in the axial direction, or the like from each other.

Furthermore, the first roller electrode 16 and the second roller electrode 18 are electrically connected to a welding power source section 50 via a lead line 48. The welding power source section 50 is configured to include an AC power source, a welding transistor, and the like (none of which are shown in the drawings), and causes conduction between the first roller electrode 16 and the second roller electrode 18 via the lead line 48.

As shown in FIG. 1, the control unit 28 includes a welding device control section 52 that controls driving of the seam welding device 26, a robot control section 54 that controls driving of the articulated robot 22, and a storage section 56 that stores design teaching data and the like. The welding device control section 52 controls the driving of the cylinder of the first drive mechanism 32 and the second drive mechanism 34, the rotational drive mechanism 46, the welding power source section 50, and the like.

The robot control section 54 adjusts the position and the like of the front end arm 24 relative to the stacked body 14 to adjust the orientation of the set of roller electrodes 16 and 18 relative to the stacked body 14, and moves the front end arm 24 such that the set of roller electrodes 16 and 18 progresses along the welding target location of the stacked body 14. In this way, as shown in FIG. 3, the set of roller electrodes 16 and 18 is caused to progress while the extension direction of the line segment L1 is inclined forward or backward in the progression direction relative to a stacking direction D1 of the stacked body 14.

In other words, by adjusting the positional relationship between the stacked body 14 and the set of roller electrodes 16 and 18 (also referred to below simply as the "positional relationship") using the robot control section 54, an inclination angle θ1 at which the line segment L1 is inclined forward or backward in the progression direction relative to the stacking direction D1 is adjusted, as the direction of the line segment L1 relative to the stacked body 14.

Furthermore, the robot control section 54 can operate based on teaching data stored in the storage section 56, for example. The storage section 56 stores design teaching data as the teaching data. The design teaching data is set based on design values of the shape of the stacked body 14, and indicates a positional relationship at which data for acquiring the direction of the line segment L1 relative to the stacked body 14 (also referred to below simply as "data") is a target value. The target value for the data can be determined in advance according to the shape, material, and the like of the stacked body 14 in a manner making it possible to favorably form the nuggets between the workpieces 12 through seam welding and restrict the occurrence of sputtering, for example.

Figure 4:
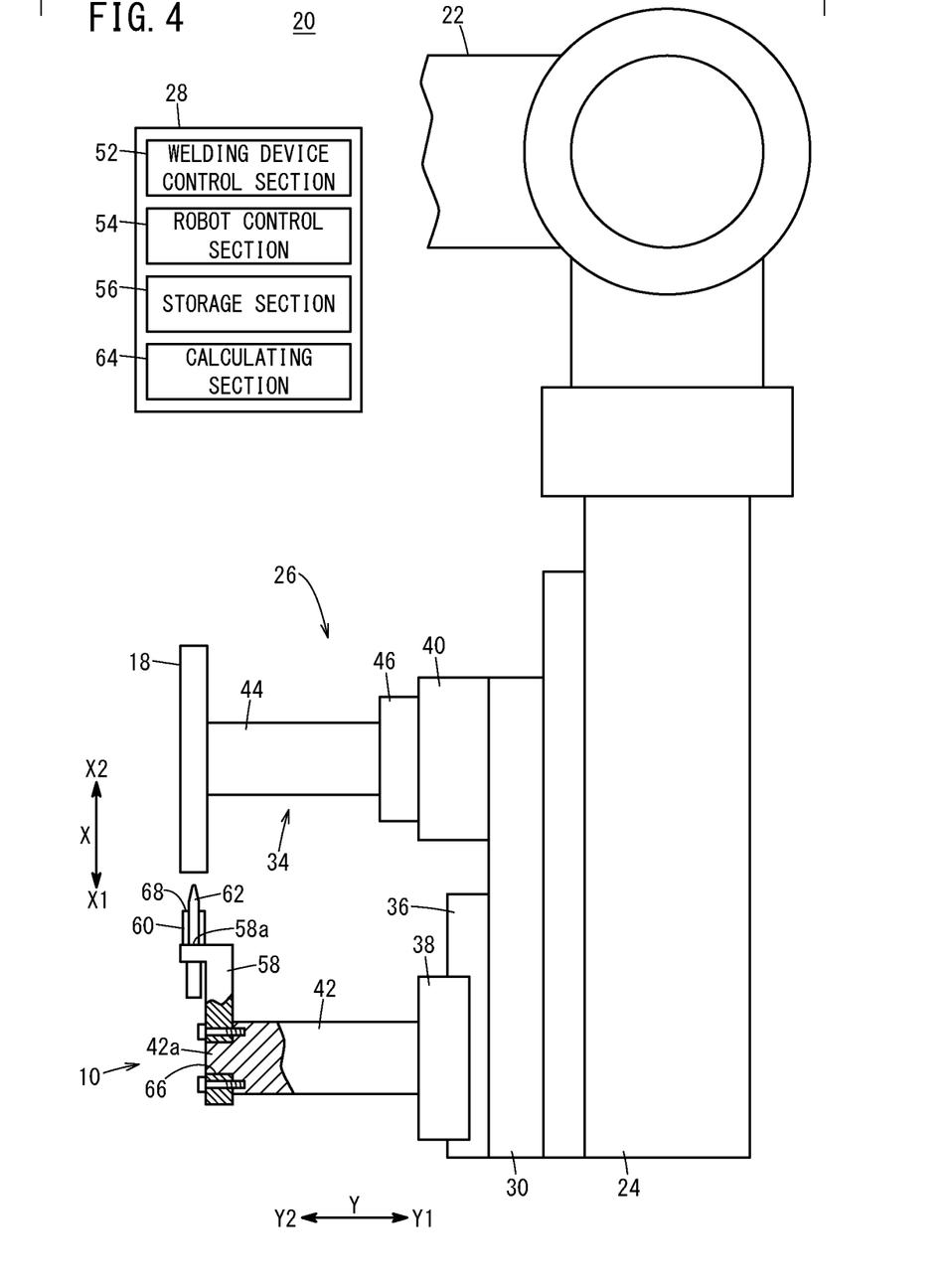
FIG. 4 is a schematic configurational view for describing the electrode orientation checking apparatus attached to the seam welding apparatus from which one of the roller electrodes has been removed.

The following describes the electrode orientation checking apparatus 10, while referencing FIGS. 4 to 7. As shown in FIG. 4, the electrode orientation checking apparatus 10 mainly includes a machine stand 58, a positioning guide 60 and a set of distance sensors 62 provided on the machine stand 58 and, for example, a calculating section 64 incorporated in the control unit 28.

The machine stand 58 is detachably attached to the seam welding apparatus 20, from which the first roller electrode 16 (see FIG. 1) has been removed. In the present embodiment, a through-hole 66 is formed in the machine stand 58. Furthermore, a small outer diameter portion 42a where the outer diameter is smaller than at other locations of the support member 42 is provided at the other end (Y2-arrow side end) of the support member 42. The outer diameter of the small outer diameter portion 42a is set to be slightly smaller than the inner diameter of the through-hole 66. In a state where the small outer diameter portion 42a of the support member 42 from which the first roller electrode 16 has been removed is inserted into the through-hole 66, the machine stand 58 is fixed to the support member 42 by screwing or the like. Therefore, even when the second roller electrode 18 is rotationally driven by the rotational drive mechanism 46, the machine stand 58 remains in a fixed state without rotating.

Figure 7:
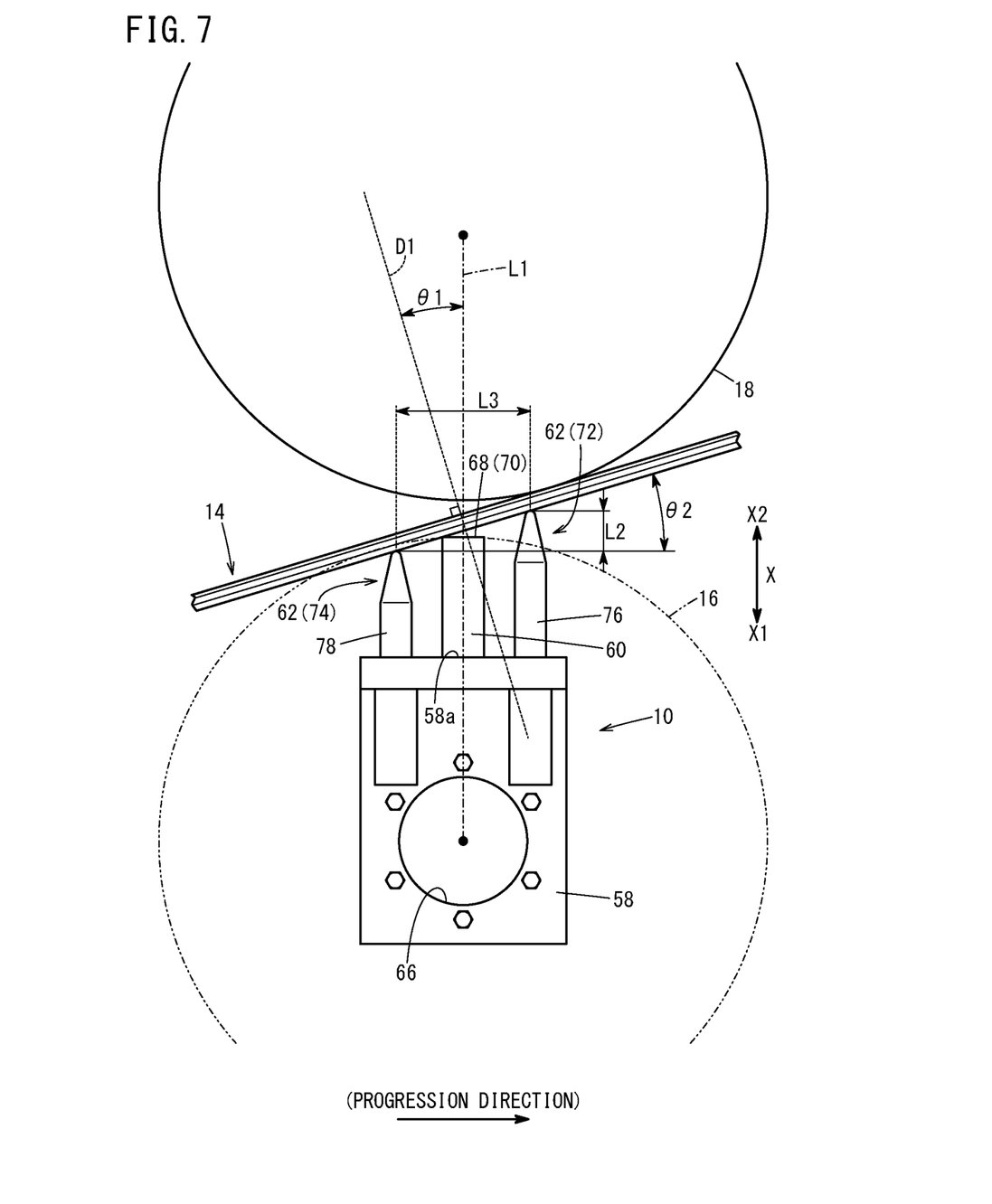
FIG. 7 is a descriptive diagram for describing a situation in which the orientation of the set of roller electrodes relative to the stacked body of the seam welding apparatus is checked by the electrode orientation checking apparatus.

The positioning guide 60 protrudes from a base surface 58a (see FIG. 5A) of the machine stand 58 toward the second roller electrode 18, and a positioning surface 68 is provided on the tip of the positioning guide 60. As shown in FIG. 7, when the stacked body 14 is sandwiched between the first roller electrode 16 before being removed and the second roller electrode 18, the positioning surface 68 is fixed at a position corresponding to a portion 70 of the outer circumferential surface of the first roller electrode 16, the portion 70 lying on the line segment L1. In FIG. 7, the configurational elements of the seam welding apparatus 20 other than the second roller electrode 18 are omitted.

In other words, it is possible to reproduce, with the positioning surface 68, the portion 70 of the outer circumferential surface of the first roller electrode 16 before being removed, the portion 70 lying on the line segment L1. Therefore, by operating the seam welding apparatus 20 to which the electrode orientation checking apparatus 10 is attached, it is possible to move the second roller electrode 18 and the positioning surface 68 relative to the progression direction while the stacked body 14 is sandwiched therebetween.

The set of distance sensors 62 is formed of a first distance sensor 72 provided farther forward in the progression direction than the positioning surface 68 and a second distance sensor 74 provided farther backward in the progression direction than the positioning surface 68. Each distance sensor 62 in the set detects, along the extension direction of the line segment L1, the distance between the distance sensor 62 and the stacked body 14 sandwiched between the positioning surface 68 and the second roller electrode 18.

Furthermore, when the seam welding apparatus 20 is operated using the design teaching data, for example, that is, when the second roller electrode 18 and the positioning surface 68 are caused to progress relative to the stacked body 14 with the positional relationship indicated by the design teaching data, each distance sensor 62 in the set is capable of continuously obtaining a detection result.

In the present embodiment, each distance sensor 62 in the set is a contact type, and the first distance sensor 72 includes a first contact 76, and the second distance sensor 74 includes a second contact 78. The distance to the stacked body 14 is detected by the first contact 76 and the second contact 78 contacting the stacked body 14. However, the present invention is not particularly limited to this, and each distance sensor 62 in the set may be a non-contact type that detects the distance to the stacked body 14 using light, ultrasonic waves, or the like.

The calculating section 64 calculates the data based on the detection results of the set of distance sensors 62. Furthermore, in a case where the seam welding apparatus 20 has operated using the design teaching data, the calculating section 64 continuously calculates the data in association with the elapsed time from when the second roller electrode 18 and the positioning surface 68 started progressing. The data calculated in this way or the direction of the line segment L1 relative to the stacked body 14 obtained from this data is stored in the storage section 56.

Here, as shown in FIG. 7, an example is described of a method in which the calculating section 64 calculates the data for acquiring the inclination angle θ1 as the direction of the line segment L1 relative to the stacked body 14. The inclination angle θ1 is equal to an angle θ2 at which a surface direction of the stacked body 14 is inclined to the X1-arrow side or the X2-arrow side relative to an orthogonal direction that is orthogonal to the extension direction of the line segment L1 (X-arrow direction). Therefore, the calculating section 64 obtains, as the data, a distance difference L2 from the difference between the absolute values of the detection results of the set of distance sensors 62. An arctangent (L2/L3) is calculated using the distance difference L2 and a distance L3 between the distance sensors 62, which is input in advance. In this way, it is possible to obtain: angle θ2=inclination angle θ1.

Figure 5A:
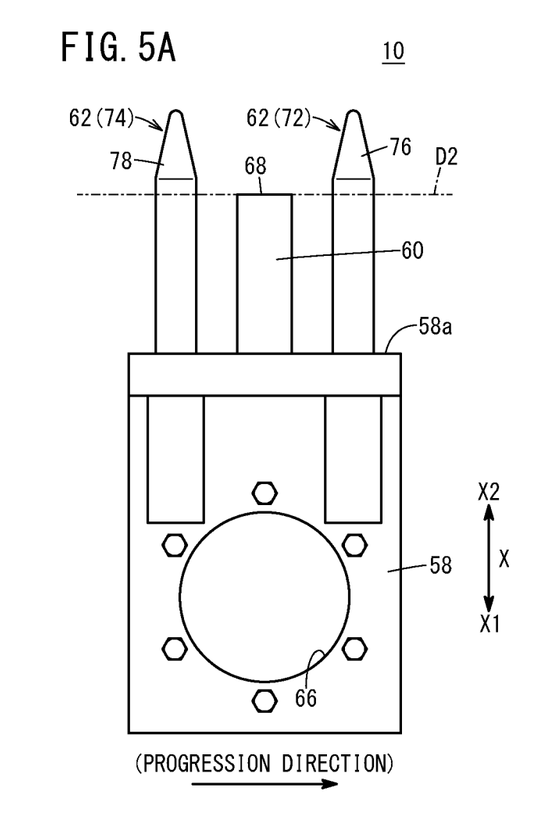
FIG. 5A is a main component schematic configurational view of the electrode orientation checking apparatus.

At this time, as shown in FIG. 5A, the set of distance sensors 62 preferably sets the position along the surface direction of the positioning surface 68 to a zero position D2 for determining a positive/negative sign, and preferably performs positive/negative sign detection. In this case, it is possible to detect, from the positive/negative sign based on the zero position D2, whether the line segment L1 is inclined forward or backward in the progression direction relative to the stacking direction D1 of the stacked body 14.

In other words, as an example, as shown in FIG. 7, in a case where the detection result of the first distance sensor 72 is greater than the distance from this first distance sensor 72 to the zero position D2 (see FIG. 5A), this detection result is a positive value. Furthermore, in a case where the detection result of the second distance sensor 74 is less than the distance from this second distance sensor 74 to the zero position D2 (see FIG. 5A), this detection result is a negative value.

Then, as described above, in a case where the detection result of the first distance sensor 72 that is positioned forward in the progression direction is positive and the detection result of the second distance sensor 74 that is positioned backward in the progression direction is negative, the calculating section 64 can determine that the line segment L1 is inclined forward in the progression direction relative to the stacking direction D1 of the stacked body 14. On the other hand, although not shown in the drawings, in a case where the detection result of the first distance sensor 72 is negative and the detection result of the second distance sensor 74 is positive, the calculating section 64 can determine that the line segment L1 is inclined backward in the progression direction relative to the stacking direction D1 of the stacked body 14.

Figure 5B:
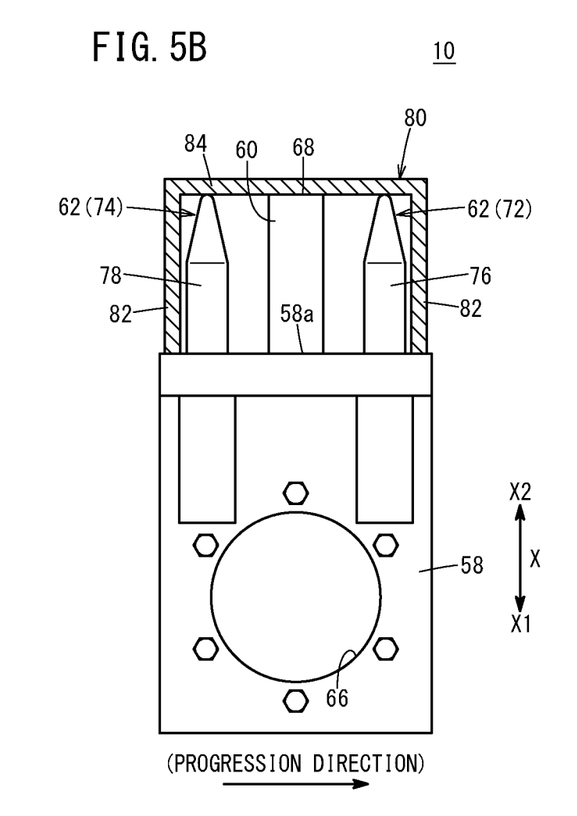
FIG. 5B is a descriptive diagram for describing a situation in which a jig for setting a zero distance is attached to the electrode orientation checking apparatus of FIG. 5A.

In the manner described above, when the zero position D2 is set for the pair of distance sensors 62, a jig 80 shown in FIG. 5B, for example, can be used. The jig 80 includes a set of leg portions 82 having the same length as each other and a contact portion 84 that spans over the base ends of the leg portions 82. Each leg portion 82 extends along the line segment L1. The length of each leg portion 82 is equal to the distance from the base surface 58a, from which the positioning guide 60 of the machine stand 58 protrudes, to the positioning surface 68. The contact portion 84 extends along a direction orthogonal to the line segment L1.

The tip of each leg portion 82 of the jig 80 is brought into contact with the base surface 58a of the machine stand 58, and the contact portion 84 of the jig 80 is brought into contact with both the positioning surface 68 and the tips of the first contact 76 and the second contact 78. Therefore, since the positioning surface 68 and the tips of the first contact 76 and the second contact 78 can be made flush, it is possible to easily set the zero position D2 for the set of distance sensors 62.

The electrode orientation checking apparatus 10 according to the present embodiment is basically configured in the manner described above. The following describes an electrode orientation checking method for checking the orientation of the set of roller electrodes 16 and 18 relative to the stacked body 14 in the seam welding apparatus 20, using this electrode orientation checking apparatus 10.

Figure 8:
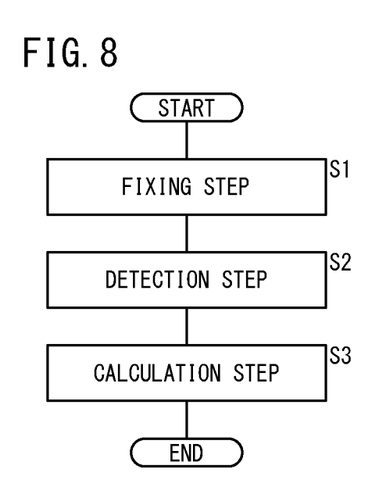
FIG. 8 is a flow chart describing an electrode orientation checking method according to an embodiment of the present invention.

First, a fixing step (step S1 of FIG. 8) is performed. In the fixing step, as shown in FIG. 4, the machine stand 58 is detachably attached to the seam welding apparatus 20 from which the first roller electrode 16 (see FIG. 1 and the like) has been removed. Then, as shown in FIG. 7, when the stacked body 14 is sandwiched between the first roller electrode 16 before being removed and the second roller electrode 18, the positioning surface 68 is fixed at a position corresponding to the portion 70 of the outer circumferential surface of the first roller electrode 16, the portion 70 lying on the line segment L1.

Figure 6:
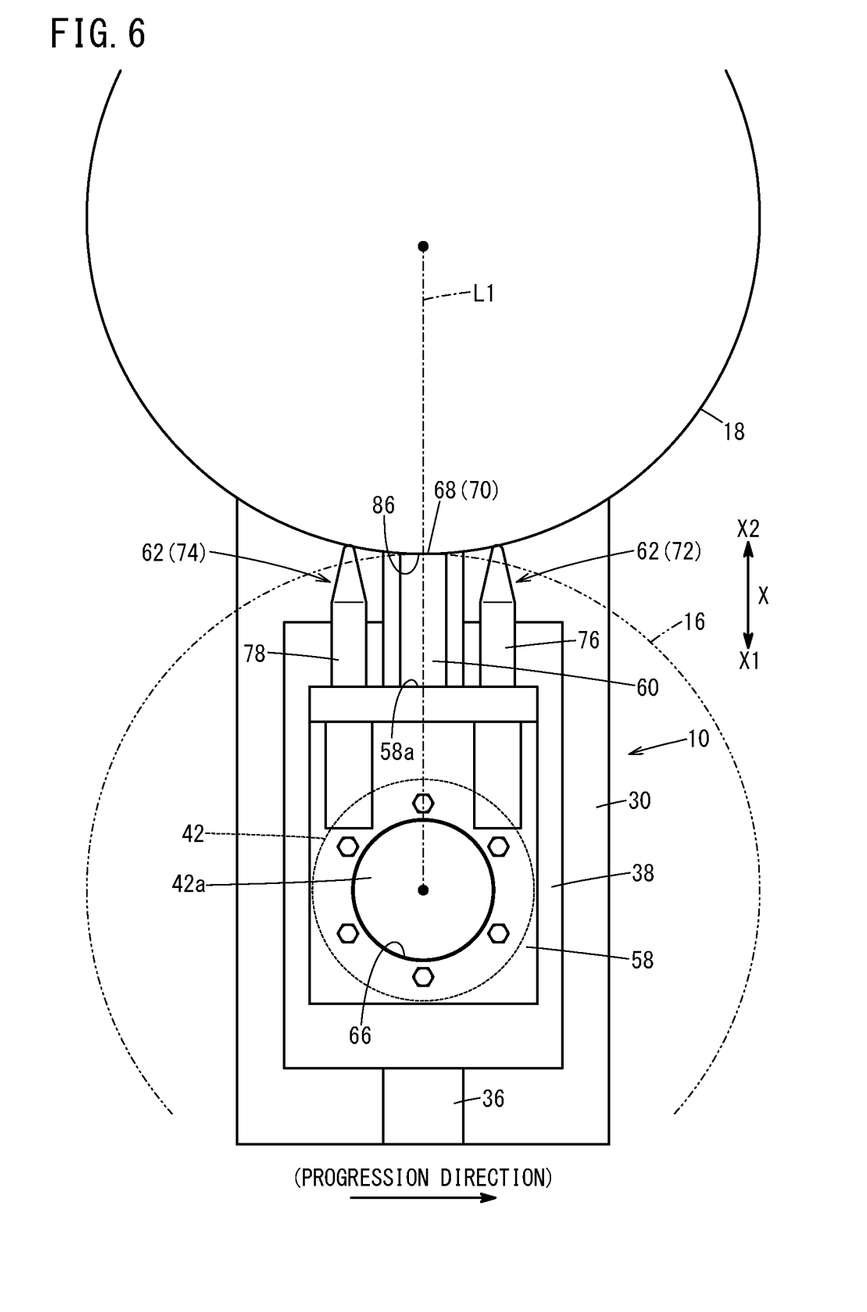
FIG. 6 is a descriptive view for describing a situation in which a machine stand of the electrode orientation checking apparatus is attached to the seam welding apparatus.

In this fixing step, for example, as shown in FIG. 6, in a state where the first drive mechanism 32 is arranged relative to the guide rail 36 such that the outer circumferential surfaces of the first roller electrode 16 and the second roller electrode 18 contact each other, the first roller electrode 16 is removed from the support member 42. Then, the machine stand 58 is attached to the support member 42 such that the positioning surface 68 contacts a portion 86, of the outer circumferential surface of the second roller electrode 18, that has been in contact with the outer circumferential surface of the first roller electrode 16 before being removed. Therefore, in a state where the portion 70 of the outer circumferential surface of the first roller electrode 16 before being removed is reproduced by the positioning surface 68, this positioning surface 68 can be moved along the extension direction of the guide rail 36 along with the first drive mechanism 32.

Furthermore, as described above, when attaching the machine stand 58 to the seam welding apparatus 20, the first contact 76 and the second contact 78, respectively, of the first distance sensor 72 and the second distance sensor 74 are provided to be capable of detecting the distance by being displaced along the extension direction of the guide rail 36. As described above, the line segment L1 extends along the guide rail 36. Therefore, by providing the first contact 76 and the second contact 78 so as to be displaceable along the extension direction of the guide rail 36, it is possible to detect the distance along the extension direction of the line segment L1 with the first distance sensor 72 and the second distance sensor 74.

Next, the seam welding apparatus 20 (see FIG. 4) is operated using the design teaching data so that the stacked body 14 is sandwiched between the positioning surface 68 and the outer circumferential surface of the second roller electrode 18, as shown in FIG. 7. At this time, the positional relationship between the stacked body 14 and the positioning surface 68 and second roller electrode 18 is set such that the data becomes the target value, based on the design values of the shape of the stacked body 14. In this state, a detection step (step S2 of FIG. 8) of detecting the distance to the stacked body 14 along the extension direction of the line segment L1 is performed by the set of distance sensors 62.

Furthermore, in the detection step, the detection by the set of distance sensors 62 is performed continuously while the second roller electrode 18 and the positioning surface 68 are caused to progress relative to the stacked body 14, based on the design teaching data. Furthermore, positive/negative sign detection with a position along the surface direction of the positioning surface 68 as the zero position D2 is performed along with the above detection by the set of distance sensors 62.

Next, a calculation step (step S3 of FIG. 8) of calculating the data by the calculating section 64 based on the detection results of the set of distance sensors 62 is performed. In the present embodiment, in the calculation step, the inclination angle θ1 is acquired as the direction of the line segment L1 relative to the stacked body 14. Therefore, the acquired data is the distance difference L2 described above. At this time, it is also detected whether the line segment L1 is inclined forward or backward in the progression direction relative to the stacking direction D1, from the positive/negative sign based on the zero position D2.

From the above, in the electrode orientation checking apparatus 10 and the electrode orientation checking method according to the present embodiment, the machine stand 58 is attached to the seam welding apparatus 20 from which the first roller electrode 16 has been removed, and the positioning surface 68 and the set of distance sensors 62 are fixed in the arrangement described above. Due to this, it is possible to reproduce, with the positioning surface 68, the portion 70 of the outer circumferential surface of the first roller electrode 16 before being removed, the portion 70 lying on the line segment L1. Therefore, by calculating the data based on the detection results of the set of distance sensors 62, it is possible to obtain the direction of the line segment L1 relative to the stacked body 14 corresponding to a case in which the stacked body 14 is sandwiched by the set of roller electrodes 16 and 18 during actual welding by the seam welding apparatus 20, without relying on the vision of a worker or the like. Accordingly, the orientation, during welding, of the set of roller electrodes 16 and 18 relative to the stacked body 14 can be checked with a high accuracy.

Furthermore, since the first roller electrode 16 is removed and the electrode orientation checking apparatus 10 is attached, it is possible to easily perform the detection with the set of distance sensors 62, without interference from the configurational components of the seam welding apparatus 20 such as the first roller electrode 16.

Yet further, with this electrode orientation checking apparatus 10, it is possible to perform the detection with the set of distance sensors 62 by bringing the portion 70 of the stacked body 14, which is in contact with the first roller electrode 16 during the actual welding by the seam welding apparatus 20, into contact with the positioning surface 68. Therefore, it is possible to check the orientation of the set of roller electrodes 16 and 18 relative to the stacked body 14 having various shapes that would be difficult to measure with a normal angle gage or the like.

In the electrode orientation checking apparatus 10 according to the embodiment described above, among the roller electrodes 16 and 18 in the set, the roller electrode (second roller electrode 18) that is not removed from the seam welding apparatus 20 is rotationally driven by the rotational drive mechanism 46 of the seam welding apparatus 20.

Furthermore, in the fixing step of the electrode orientation checking method according to the embodiment described above, among the roller electrodes 16 and 18 in the set, the electrode roller that is not rotationally driven by the rotational drive mechanism 46 of the seam welding apparatus 20 is removed from the seam welding apparatus 20.

In these cases, in the same manner as during actual welding using the seam welding apparatus 20, the second roller electrode 18 and the positioning surface 68 can be caused by the rotational drive mechanism 46 to progress relative to the stacked body 14, and therefore it is possible to more accurately check the orientation, during welding, of the set of roller electrodes 16 and 18 relative to the stacked body 14. As described above, in a case where the seam welding apparatus 20 does not include the rotational drive mechanism 46 and causes the set of roller electrodes 16 and 18 to progress using the articulated robot 22 (see FIG. 1), either of the roller electrodes 16 and 18 may be removed from the seam welding apparatus 20 and the electrode orientation checking apparatus 10 may be attached.

In the electrode orientation checking apparatus 10 according to the embodiment described above, the calculating section 64 calculates the data for acquiring, as the direction of the line segment L1 relative to the stacked body 14, the inclination angle θ1 at which the extension direction of the line segment L1 is inclined forward or backward in the progression direction relative to the stacking direction D1 of the stacked body 14.

Furthermore, in the calculation step in the electrode orientation checking method according to the embodiment described above, the data for acquiring, as the direction of the line segment L1 relative to the stacked body 14, the inclination angle θ1 at which the extension direction of the line segment L1 is inclined forward or backward in the progression direction relative to the stacking direction D1 of the stacked body 14, is calculated.

In the electrode orientation checking apparatus 10 according to the embodiment described above, the set of distance sensors 62 sets a position along the surface direction of the positioning surface 68 as the zero position D2 for determining the positive/negative sign, and the calculating section 64 obtains the inclination angle θ1 from the difference between the absolute values of the detection results of the set of distance sensors 62 and the distance L3 between the distance sensors 62 and also detects whether the extension direction of the line segment L1 is inclined forward or backward in the progression direction relative to the stacking direction D1 of the stacked body 14, from the positive/negative sign based on the zero position D2.

Furthermore, in the detection step of the electrode orientation checking method according to the embodiment described above, the detection of the positive/negative sign is performed by the set of distance sensors 62 with a position along the surface direction of the positioning surface 68 set as the zero position D2, and in the calculation step, the inclination angle θ1 is obtained from the difference between the absolute values of the detection results of the set of distance sensors 62 and the distance L3 between the distance sensors 62, and whether the extension direction of the line segment L1 is inclined forward or backward in the progression direction relative to the stacking direction D1 of the stacked body 14 is detected from the positive/negative sign based on the zero position D2.

In these cases, the orientation of the set of roller electrodes 16 and 18 relative to the stacked body 14 can be obtained with a simple configuration and a high accuracy.

In the electrode orientation checking apparatus 10 according to the embodiment described above, the calculating section 64 continuously calculates the data associated with the elapsed time from when the other roller electrode (second roller electrode 18) and the positioning surface 68 start progressing relative to the stacked body 14, based on the detection results of the set of distance sensors 62.

In the detection step of the electrode orientation checking method according to the embodiment described above, the detection by the set of distance sensors 62 is performed continuously while the other roller electrode and the positioning surface 68 are caused to progress relative to the stacked body 14, and in the calculation step, the data associated with the elapsed time from when the other roller electrode and the positioning surface 68 start progressing relative to the stacked body 14 is calculated continuously, based on the detection results of the set of distance sensors 62.

In the electrode orientation checking apparatus 10 according to the embodiment described above, when the seam welding apparatus 20 is operated using the design teaching data that is set based on the design values of the shape of the stacked body 14 and indicates a positional relationship between the stacked body 14 and the set of roller electrodes 16 and 18 in a case where the data becomes the target value, the calculating section 64 continuously calculates the data associated with the elapsed time.

In the detection step of the electrode orientation checking method according to the embodiment described above, the detection by the set of distance sensors 62 is performed continuously while the seam welding apparatus 20 is operated using the design teaching data that is set based on the design values of the shape of the stacked body 14 and indicates a positional relationship between the stacked body 14 and the set of roller electrodes 16 and 18 in a case where the data becomes the target value.

As an example, there are cases where the data does not become the target value even with the positional relationship indicated by the design teaching data, due to variations between the design values of the shape of the stacked body 14 and the actual shape of the stacked body 14 or the like. In other words, there are cases where, when the positional relationship indicated by the design teaching data is attempted, the seam welding is performed in a state where the direction of the line segment L1 relative to the stacked body 14 is deviated from the target.

With the electrode orientation checking apparatus 10, as described above, it is possible to obtain the data corresponding to a case where the stacked body 14 is sandwiched by the set of roller electrodes 16 and 18 during actual welding by the seam welding apparatus 20. In other words, it is possible to obtain actual measured values of data based on the actual shape of the stacked body 14. Accordingly, by calculating the difference between the actual measured values and the target values of the data, it is possible to reflect this difference in the design teaching data, for example, thereby making it possible to create corrected teaching data that indicates the positional relationship set such that the data satisfies the target values, based on the actual shape of the stacked body 14.

Furthermore, the difference described above can be obtained for each welding target location of the stacked body 14 passed by the second roller electrode 18 and the positioning surface 68, from the speed at which the second roller electrode 18 and the positioning surface 68 progress and the elapsed time described above. Accordingly, it is possible to efficiently create the corrected teaching data indicating the positional relationship set such that the data satisfies the target values, based on the actual shape of the stacked body 14. The electrode orientation checking apparatus 10 may perform the detection by the set of distance sensors 62 and the data calculation by calculating section 64 in a state where the progression of the second roller electrode 18 and the positioning surface 68 relative to the stacked body 14 has been stopped.

The present invention is not particularly limited to the embodiments described above, and various modifications can be made without deviating from the scope of the present invention.

What is claimed is:

1. An electrode orientation checking method that, for a seam welding apparatus that performs seam welding by sandwiching a stacked body comprising a plurality of stacked workpieces between a first roller electrode and a second roller electrode, checks an orientation of the first roller electrode and the second roller electrode to the stacked body, the electrode orientation checking method comprising:

a fixing step of detachably attaching a machine stand that includes a positioning guide to the seam welding apparatus from which the first roller electrode has been removed, and fixing a positioning surface of the positioning guide at a position that, when the stacked body is sandwiched between the first roller electrode before being removed and the second roller electrode, corresponds to a portion of an outer circumferential surface of the first roller electrode, the portion lying on a line segment connecting rotational centers of the first roller electrode and the second roller electrode;

a detection step of, with a set of distance sensors provided on the machine stand and respectively fixed farther forward than the positioning surface and farther backward than the positioning surface in a progression direction of the first roller electrode relative to the stacked body, detecting a distance, along an extension direction of the line segment, to the stacked body sandwiched by the positioning surface and the second roller electrode; and a calculation step of calculating data for acquiring a direction of the line segment relative to the stacked body, based on detection results of the set of distance sensors.

2. The electrode orientation checking method according to claim 1, wherein in the fixing step, among the first roller electrode and the second roller electrode, the first roller electrode that is not rotationally driven by a rotational drive mechanism of the seam welding apparatus, is removed from the seam welding apparatus.

3. The electrode orientation checking method according claim to 1, wherein
in the calculation step, in order to acquire an inclination angle between the extension direction of the line segment and a stacking direction of the stacked body, a difference between absolute values of the detection results of the set of distance sensors is calculated.

4. The electrode orientation checking method according to claim 1, wherein
in the detection step, the detection by the set of distance sensors is performed continuously while the second roller electrode and the positioning surface are caused to progress relative to the stacked body, and
in the calculation step, the difference between the absolute values of the detection results of the set of distance sensors, being associated with elapsed time from when the second roller electrode and the positioning surface start progressing relative to the stacked body, is calculated continuously, based on the detection results of the set of distance sensors.

5. The electrode orientation checking method according to claim 1, wherein
in the detection step, the detection by the set of distance sensors is performed continuously while the seam welding apparatus is operated using design teaching data that is set based on a design value of a shape of the stacked body and that indicates a positional relationship between the first roller electrode and the second roller electrode and the stacked body in a case where the difference between the absolute values of the detection results of the set of distance sensors becomes a target value.

* * * * *